United States Patent Office 3,164,615
Patented Jan. 5, 1965

3,164,615
MIXTURES OF BLUE DISPERSE DYESTUFFS OF THE ANTHRAQUINONE SERIES
Paul Buecheler, Reinach, Basel-Land, Switzerland, assignor to Sandoz Ltd. (also known as Sandoz A.G.), Basel, Switzerland
No Drawing. Filed Nov. 30, 1959, Ser. No. 856,021
Claims priority, application Switzerland, Dec. 4, 1958, 66,911
6 Claims. (Cl. 260—376)

This invention relates to mixtures of blue disperse dyestuffs of the anthraquinone series of the formula

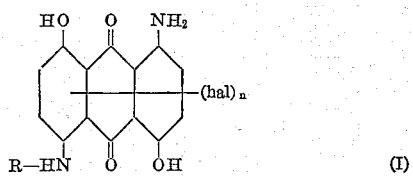

wherein R stands for alkyl which may be substituted, hal stands for chlorine or bromine, and $n$ has a statistical value between 0.5 and 1.5.

The process for the production of the new blue disperse dyestuffs of the anthraquinone series consists in treating with a halogenizing agent an anthraquinone compound of the formula

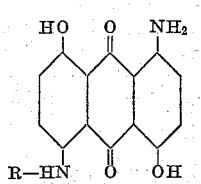

wherein R stands for alkyl which may be further substituted.

The anthraquinone compunds used as starting materials can be produced by the known methods, e.g. by alkylation of one amino group in 1.5-diamino-4.8-dihydroxyanthraquinone, or by alkylation of the amino group of 1-nitro-5-amino-4.8-dihydroxyanthraquinone and subsequent reduction of the nitro group to the amino group, or again by replacement of the nitro group of 5-nitro-1-amino-4.8-dihydroxyanthraquinone by an alkylamino group.

Halogenation according to the invention can be carried out, for example, by treating the aforementioned starting materials with halogenizing agents, e.g. chlorine, bromine, sulfuryl chloride etc., at a temperature between 10° and 160° C. in sulfuric acid, fuming sulfuric acid, or in a suitable organic solvent such as halogenobenzene or nitrobenzene. Under certain circumstances it is necessary to add to the reaction mixture boric acid and/or paraformaldehyde or one of the agents commonly used for halogenation, e.g. iodine.

Often it is possible to accomplish the halogenizing reaction in the same solvent as that used for the previous alkylating operation without further processing of the 5-alkylamino - 1-amino - 4.8 - dihydroxyanthraquinone compound; for example, by methylation of 1.5-diamino-4.8-dihydroxyanthraquinone with methyl sulfuric acid in sulfuric acid solution and subsequent bromination in the same solution in presence of boric acid.

The compounds conforming to the present invention have an average content of 0.5 to 1.5 atoms of halogen, by virtue of which they possess appreciably better fastness properties than are shown by dyestuffs produced with unhalogenated starting products when applied as disperse dyestuffs.

The anthraquinone dyestuffs of the present invention possess good affinity for the hydrophobic fibers and reserve wool and cotton well. Upon conversion into a finely divided state they are eminently suitable for dyeing and printing in aqueous suspension cellulose esters and ethers, synthetic polyamides and linear aromatic polyesters in blue shades. Those dyestuffs which possess sufficiently high solubility in organic solvents such as acetone or dimethylformamide can also be used for dyeing cellulose esters such as cellulose acetate, propionate, butyrate or acetobutyrate or polyacrylonitrile in the mass. The dyeings on secondary cellulose acetate possess good fastness to light, washing, perspiration and gas fumes; those on cellulose triacetate, e.g. Arnel, Courpleta (registered trademarks) and on the linear aromatic polyesters, e.g. Dacron, Terylene, Tergal, Diolen (registered trademarks) exhibit high fastness to light, washing, pressing, pleating and heat setting. The dyeings on polyamide fibers are fast to light, washing, water, scrooping and, in particular, to perspiration.

In the following examples all parts and percentages are by weight and the temperatures are in degrees centigrade.

*Example 1*

To 735 parts of sulfuric acid monohydrate are added dropwise with stirring at 5–10° 125 parts of methyl alcohol. Subsequently, 54 parts of 1.5-diamino-4.8-dihydroxyanthraquinone are added to the solution and the reaction mixture is then heated to 150° in the course of 5 hours and stirred for 6 hours at the same temperature. It is then stirred into 4000 parts of water and the precipitate formed is filtered off, washed with water and dried. 15 parts of the product are stirred into a mixture of 130 parts of sulfuric acid monohydrate, 10 parts of 27% oleum and 4 parts of boric acid. The reaction mass is heated to 80° and at this temperature 6 parts of bromine are dropped in over a period of 4 hours. The mass is stirred for a further 20 hours at 80° and then stirred into 1000 parts of water. The precipitate formed is filtered with suction, washed with water and dried. The reaction product obtained contains 23.4% bromine, which is equivalent to an average amount of 1.08 atoms of bromine per molecule. It dissolves in chlorobenzene to give greenish blue solutions.

A similar dyestuff with 6.8% chlorine content which is equivalent to an average amount of 0.77 atom of chlorine per molecule is obtained when chlorine is introduced at 40° in place of bromine.

100 parts of a polyester fiber are entered in a dyebath at 60° set with 3000 parts of water, 2 parts of the dyestuff of this example, and 1.5 parts of 2-hydroxy-1.1'-diphenyl. The dyebath is brought to the boil in 20 minutes, the goods dyed to shade at the boil for 1 hour, then removed, rinsed with water and dried. The polyester fiber is dyed in an attractive, bright greenish blue shade which is very fast to light, washing, pressing and pleating.

Example 2

14 parts of 1.5-diamino-4.8-dihydroxyanthraquinone, 90 parts of polyethylene glycol, 25 parts of 4-methylbenzene-1-sulfonic acid ethyl ester, 15 parts of sodium carbonate and 10 parts of pyridine are heated to 160° in 2 hours with stirring. The reaction mass is stirred for a further 24 hours at this temperature, allowed to cool to 40° and run into 800 parts of water. The precipitate thus formed is filtered off, washed with water until the filtrate is of neutral reaction, and dried.

15 parts of the 1-ethylamino-4.8-dihydroxy-5-aminoanthraquinone thus obtained are stirred into a mixture of 128 parts of sulfuric acid monohydrate, 10 parts of 27% oleum and 4 parts of boric acid. The reaction mass is heated to 84° and 6 parts of bromine are added dropwise in the course of 4 hours. After a further 24 hours' stirring at 85° it is run into 1000 parts of cold water and the precipitate filtered off, washed with water until the filtrate is of neutral reaction, and dried at 40° with vacuum.

The dyestuff obtained contains 18% bromine which is equivalent to an average amount of 0.81 atom of bromine per molecule.

100 parts of secondary cellulose acetate are mixed for a short time with 300 parts of a mixture of solvents containing 93% acetone and 7% methanol, and left overnight to swell. Next day 1 part of the dyestuff in this example is dissolved in 100 parts of the same solvent mixture by shaking and the solution added to the cellulose acetate solution. The colored dope is stirred in an open vessel until 100 parts of the solvent have evaporated. It is then spun in the normal way to give filaments of a bright blue shade with good fastness to light, washing, perspiration and gas fumes.

Example 3

27 parts of 1-amino-4.8-dihydroxy-5-nitroanthraquinone (obtainable according to the process described in Swiss patent application 66,859), 27 parts of 1-amino-2-cyanopropane and 160 parts of 1.2-dichlorobenzene are stirred for 4 hours at 165°. 180 parts of isopropyl alcohol are added to the reaction mass at 80°, which is then cooled to 5°. The precipitate formed is filtered off, washed with isopropyl alcohol and then with water, and dried.

18 parts of the 1-amino-4.8-dihydroxy-5(2'-cyano)-propylaminoanthraquinone obtained, 128 parts of sulfuric acid monohydrate, 11 parts of 27% oleum and 4 parts of boric acid are stirred at 86°. In the course of 4 hours 9 parts of bromine are added dropwise and the mass stirred for a further 8 hours at 86°. It is then stirred into 1000 parts of water. The precipitate formed is filtered with suction, washed with water and dried. The dyestuff is obtained with a good yield; it has a bromine content of 21.6% which is equivalent to an average amount of 1.15 atoms of bromine per molecule.

1 part of this dyestuff, 1 part of the sodium salt of dinapthylmethanedisulfonic acid and 8 parts of water are ground together until a fine dispersion is obtained, which is run into a dyebath composed of 3000 parts of water and 6 parts of Marseilles soap. 100 parts of a fabric of secondary cellulose acetate are entered in this dyebath and the temperature increased to 80° in 30 minutes, this temperature being maintained for a further hour. The fabric is then removed, rinsed with water and dried. A bright blue dyeing of very good fastness to light, gas fumes and perspiration is obtained.

On cellulose triacetate the dyestuff is notable for its high affinity and the very good fastness to light, washing, perspiration and heat setting which is obtained.

Example 4

156 parts of 1-(2'-carboxy)-ethylamino-4.8-dihydroxy-5-nitroanthraquinone (obtained according to Swiss patent application 45,232), 575 parts of water and 45 parts of sodium carbonate are stirred at 71°. In the course of 1 hour are added dropwise and simultaneously at 72–75° 120 parts of 30% sodium hydroxide solution and a solution of 90 parts of grape sugar in 270 parts of water. The mass is stirred for a further 30 minutes at 78° and 140 parts of 30% hydrochloric acid are slowly added. The precipitate formed is filtered with suction, washed with water until the filtrate is of neutral reaction, and dried.

120 parts of the 1-(2'-carboxy)-ethylamino-4.8-dihydroxy-5-aminoanthraquinone thus obtained, 1012 parts of sulfuric acid monohydrate, 106 parts of 27% oleum and 40 parts of boric acid are stirred at 95°. In the course of 6 hours 60 parts of bromine are added dropwise at 95–98° and the mass heated for a further 16 hours at 96°. The reaction mass is then run into 8000 parts of water. The suspension is heated to 95° and the precipitate is filtered hot, washed with water until of neutral reaction and dried.

120 parts of the 1-(2'-carboxy)-ethylamino-4.8-dihydroxy-5-aminobromanthraquinone, 384 parts of anhydrous ethyl alcohol and 74 parts of sulfuric acid monohydrate are stirred for 5 hours at 78°. On cooling to 20° 800 parts of water are run slowly into the reaction mass with cooling. Then 10 parts of 30% sodium hydroxide solution are dropped in and 10 parts of sodium carbonate added. The precipitate formed is filtered with suction, washed with water and dried at 40° with vacuum.

The dyestuff obtained contains 22.4% of bromine which is equivalent to an average amount of 1.29 atoms of bromine per molecule. It gives blue dyeings on fabrics of linear aromatic polyesters, which are characterized by excellent fastness to light, washing, heat setting, pleating and perspiration. Wool or cotton present in the dyebath is reserved.

Example 5

10 parts of 1-amino-4.8-dihydroxy-5-methylaminoanthraquinone, 80 parts of 1.2-dichlorobenzene and 10 parts of sulfuryl chloride are stirred for 4 hours at 60°. The reaction mass is allowed to cool and the precipitate filtered with suction, washed with benzene and water, and dried. The dyestuff obtained dissolves in chlorobenzene with a blue coloration. It contains 10.9% of chlorine, which is equivalent to an average amount of 0.98 atom of chlorine per molecule.

Example 6

10 parts of 1-amino-4.8-dihydroxy-5-methylaminoanthraquinone, 85 parts of nitrobenzene and 0.1 part of iodine are mixed at 60°. In the course of 2 hours 9 parts of bromine are added dropwise. The reaction mass is stirred for 6 hours at 60° and then 80 parts of methyl alcohol are added. The precipitate formed is filtered with suction, washed with methyl alcohol and water and dried.

The dyestuff obtained is similar to that of Example 1. It contains 19.2% of bromine, which is equivalent to an average amount of 0.84 atom of bromine per molecule.

The following table contains further dyestuffs which are obtainable according to the details given in Examples 1 to 6. They are characterized by the starting product, the halogen introduced, the percentage content and the atomic proportion of the halogen in the dyestuff, and the color of the dyestuff in acetone solution.

| Example No. | Starting Product | Halogen | Content, Percent | Atomic Proportion | Color in Acetone Solution |
|---|---|---|---|---|---|
| 7 | 1-n-propylamino-4.8-dihydroxy-5-aminoanthraquinone. | Bromine | 16 | 0.74 | Blue. |
| 8 | 1-n-butylamino-4.8-dihydroxy-5-aminoanthraquinone. | do | 18 | 0.90 | Do. |
| 9 | n-propylester of 1-(2'-carboxyethyl)-amino-4.8-dihydroxy-5-aminoanthraquinone. | Chlorine | 11.8 | 1.49 | Do. |
| 10 | Methyl ester of 1-(2'-carboxyethyl)-amino-4.8-dihydroxy-5-aminoanthraquinone. | Bromine | 24 | 1.46 | Do. |
| 11 | 1-(2'-methyl)-propylamino-4.8-dihydroxy-5-aminoanthraquinone. | do | 19 | 0.96 | Do. |
| 12 | 1-methylamino-4.8-dihydroxy-5-aminoanthraquinone. | do | 12.6 | 0.51 | Do. |

Formulae of representative dyestuffs of the foregoing examples are as follows:

*Example 1*

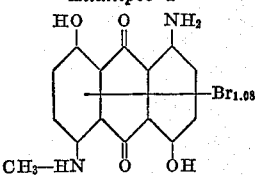

*Example 2*

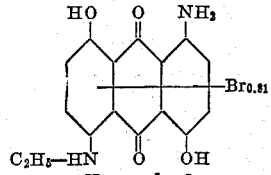

*Example 3*

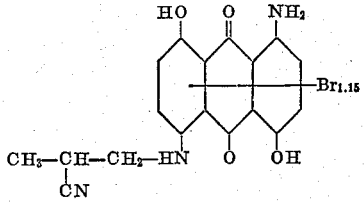

*Example 4*

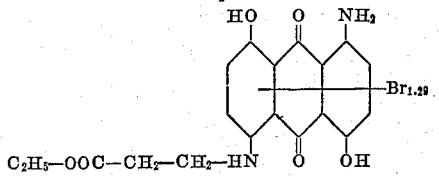

*Example 5*

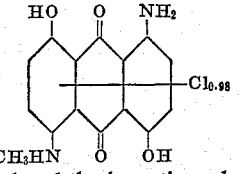

Having thus disclosed the invention what I claim is:

1. Blue disperse dyestuff mixtures consisting of the halogenation product of an anthraquinone compound of the formula:

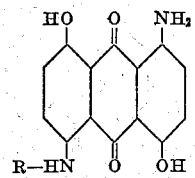

wherein R represents a member selected from the group consisting of unsubstituted and substituted primary lower alkyls, the substituents being chosen from the group consisting of cyano and lower carboalkoxy, said mixtures containing an average of from 0.5 to 1.5 atoms of halogen selected from the group consisting of chlorine and bromine per anthraquinone molecule.

2. A blue disperse dyestuff mixture consisting of the bromination product of an anthraquinone compound of the formula:

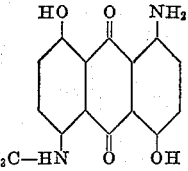

said mixture containing 1.08 atoms of bromine per molecule of anthraquinone.

3. A blue disperse dyestuff mixture consisting of the chlorination product of an anthraquinone compound of the formula:

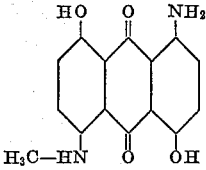

said mixture containing 0.98 atom of chlorine per molecule of anthraquinone.

4. A blue disperse dyestuff mixture consisting of the bromination product of an anthraquinone compound of the formula:

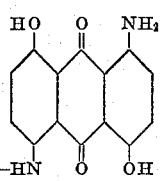

said mixture containing 1.29 atoms of bromine per molecule of anthraquinone.

5. A blue disperse dyestuff mixture consisting of the bromination product of an anthraquinone compound of the formula:

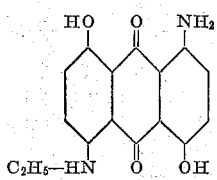

said mixture containing 0.81 atom of bromine per molecule of anthraquinone.

6. A blue disperse dyestuff mixture consisting of the bromination product of an anthraquinone compound of the formula:

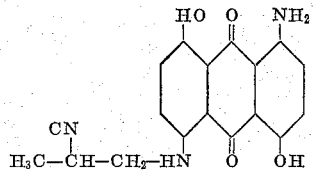

said mixture containing 1.15 atoms of bromine per molecule of anthraquinone.

References Cited by the Examiner

UNITED STATES PATENTS

| | | | |
|---|---|---|---|
| 1,078,505 | 11/13 | Herzberg et al. | 260—376 |
| 2,053,277 | 9/36 | Ellis et al. | 8—40 |
| 2,319,043 | 5/43 | Dickey et al. | 260—376 |
| 2,604,480 | 7/52 | Seymour et al. | 260—380 |
| 2,659,738 | 11/53 | Schlichting et al. | 260—376 |
| 2,659,739 | 11/53 | Dickey | 260—380 |
| 2,677,694 | 5/54 | Randall et al. | 260—380 |
| 2,727,045 | 12/55 | McSheehy | 260—381 XR |
| 2,918,344 | 12/59 | Jenny | 8—39 |
| 2,944,870 | 7/60 | Atkinson et al. | 8—39 |

FOREIGN PATENTS

| | | |
|---|---|---|
| 217,131 | 11/57 | Australia. |
| 220,354 | 11/57 | Australia. |
| 787,379 | 12/57 | Great Britain. |

LORRAINE A. WEINBERGER, *Acting Primary Examiner.*

CHARLES B. PARKER, LEON ZITVER, *Examiners.*